Oct. 6, 1959 R. L. HALVORSON 2,907,874

MICROWAVE COMMUNICATION SYSTEM

Filed Feb. 25, 1955 4 Sheets-Sheet 1

WITNESSES

Edwin E. Bassler

T. H. Murray

INVENTOR

Robert L. Halvorson

BY F. E. Browder

ATTORNEY

Oct. 6, 1959 R. L. HALVORSON 2,907,874

MICROWAVE COMMUNICATION SYSTEM

Filed Feb. 25, 1955 4 Sheets-Sheet 2

Oct. 6, 1959 R. L. HALVORSON 2,907,874

MICROWAVE COMMUNICATION SYSTEM

Filed Feb. 25, 1955 4 Sheets-Sheet 3

United States Patent Office 2,907,874

Patented Oct. 6, 1959

2,907,874

MICROWAVE COMMUNICATION SYSTEM

Robert L. Halvorson, Baltimore, Md., assignor to Westinghouse Electric Corporation, East Pittsburgh, Pa., a corporation of Pennsylvania Application February 25, 1955, Serial No. 490,460

11 Claims. (Cl. 250—15)

This invention relates to radio communication systems and more particularly to a microwave communication system in which intelligence signals are relayed over long distances by means of a plurality of spaced repeater stations.

In a point-to-point microwave communication system a series of spaced radio repeater stations are used to relay intelligence signals over long distances. The intelligence signals are transmitted from station to station on line-of-sight microwave carrier signals which effectively link the stations together into a continuous communication chain. At the opposite ends of the communication chain are terminal stations which are linked by carrier energy with the nearest repeater station in the system. Intelligence signals may be transmitted from either terminal station to the other through the repeater stations; and, in a similar manner, signals may be transmitted from a repeater station in both directions to all other stations in the communication chain. Whenever an intelligence signal is transmitted from one of the stations, it may be detected at any other station in the system which is equipped with intelligence reproducing apparatus.

The carrier signals used in a microwave system have a fundamental difference from more familiar radio frequencies in that their extremely short wave length gives them the property of a beam of light. That is, they travel in a straight line-of-sight path. Because of this property, the microwave carrier energy from a transmitting station can, by means of a parabolic reflector, be directed in a straight line to the antenna of a receiving station. These characteristics make microwave carrier signals particularly desirable for private communications since the microwave signals cannot be detected unless the antenna of a receiver is placed in the line-of-sight path between two repeater stations.

An inherent and most beneficial characteristic of microwave radio is its ability to carry a large number of sub-carrier signals on a single microwave carrier signal. This is accomplished by multiplexing equipment which provides a means whereby a microwave signal may be modulated with a plurality of sub-carrier signals at a transmitting station and demodulated with little distortion at a receiving station. The sub-carrier signals are, in turn, modulated with intelligence signals at a transmitting station and then demodulated at a receiving station so that many (usually 30) two-way voice or intelligence communications can be carried simultaneously on a single microwave signal.

Although existing microwave systems are generally considered sufficiently reliable for uninterrupted and continuous communication, there is always the possibility of failure of one or more repeater stations in a system. In addition, there is the possibility that the line-of-sight carrier signal between two stations will be temporarily curved or bent away from a receiving antenna due to unavoidable atmospheric layering or reflective conditions. Signal cancellation between stations due to multipath reflections on over-water paths is particularly troublesome. When these conditions occur, the communication chain is broken; and, consequently, stations on one side of the break cannot communicate with the stations on the other side. Obviously, it would be desirable to provide a microwave communication system in which the communication chain would always remain intact even though a fade or break in signal occurs between two stations.

It is a primary object of my invention to provide a closed loop microwave communication system in which communication will always be established between all the stations in the system even though there be a break in communication between any two adjacent stations. I effect this object by providing means for connecting the two terminal stations at the opposite ends of the communication system together to form a repeater station whenever a break in communication occurs between two stations in the system. Figuratively speaking, the ends of the communication chain of microwave stations are joined together when a break occurs so that the composite chain is kept intact at all times. Signals from stations on one side of a break will be relayed through the terminal stations (which now form a repeater station) to stations on the other side of the break.

Another object of my invention resides in the elimination of microwave radio standby equipment which functions to replace a temporarily defective microwave transmitter or receiver in the communication system. Failure of a single transmitter or receiver at repeater or terminal stations of the microwave system would normally cause interruption of communication in at least one direction. Radio standby equipment is, therefore, usually installed to "take over" when a radio equipment failure occurs so as to insure continuity of communication service. In essentially the same manner as the present invention protects the microwave system from interruptions due to fades between adjacent stations, it also insures continuity of service during failure of any one transmitter or receiver in the system without the usual initial expense and operating cost of duplicate transmitter and receiver standby equipment. Further, by means of the present invention, a temporarily defective antenna or transmission line will not cause interruption of communication in the microwave system.

In a repeater station network of the type described above, the repeater stations are often separated by distances of approximately 30 miles. It is impractical to have an attendant located at each of these stations to detect a failure when it occurs. Therefore, without some sort of fault indicating means, a party at an attended station would never know which station has failed when a break occurs, or, for that matter, that a station had failed at all. Accordingly, means are provided in conjunction with the present invention for indicating at an attended station in the repeater station network (1) one or more unattended stations at which an equipment failure may exist and (2) the type of equipment failure existing at that station or stations. One type of fault indicating means which may be used in conjunction with my invention is fully described in copending application Serial No. 438,393, filed June 22, 1954, now Patent No. 2,862,056, and application Serial No. 443,622, filed July 15, 1954, both applications being assigned to the assignee of the present application.

A preferred embodiment for carrying forth my invention, together with further objects and features thereof, will be understood from the following detailed description taken in connection with the accompanying drawings which form a part of this specification and in which.

Figure 1:
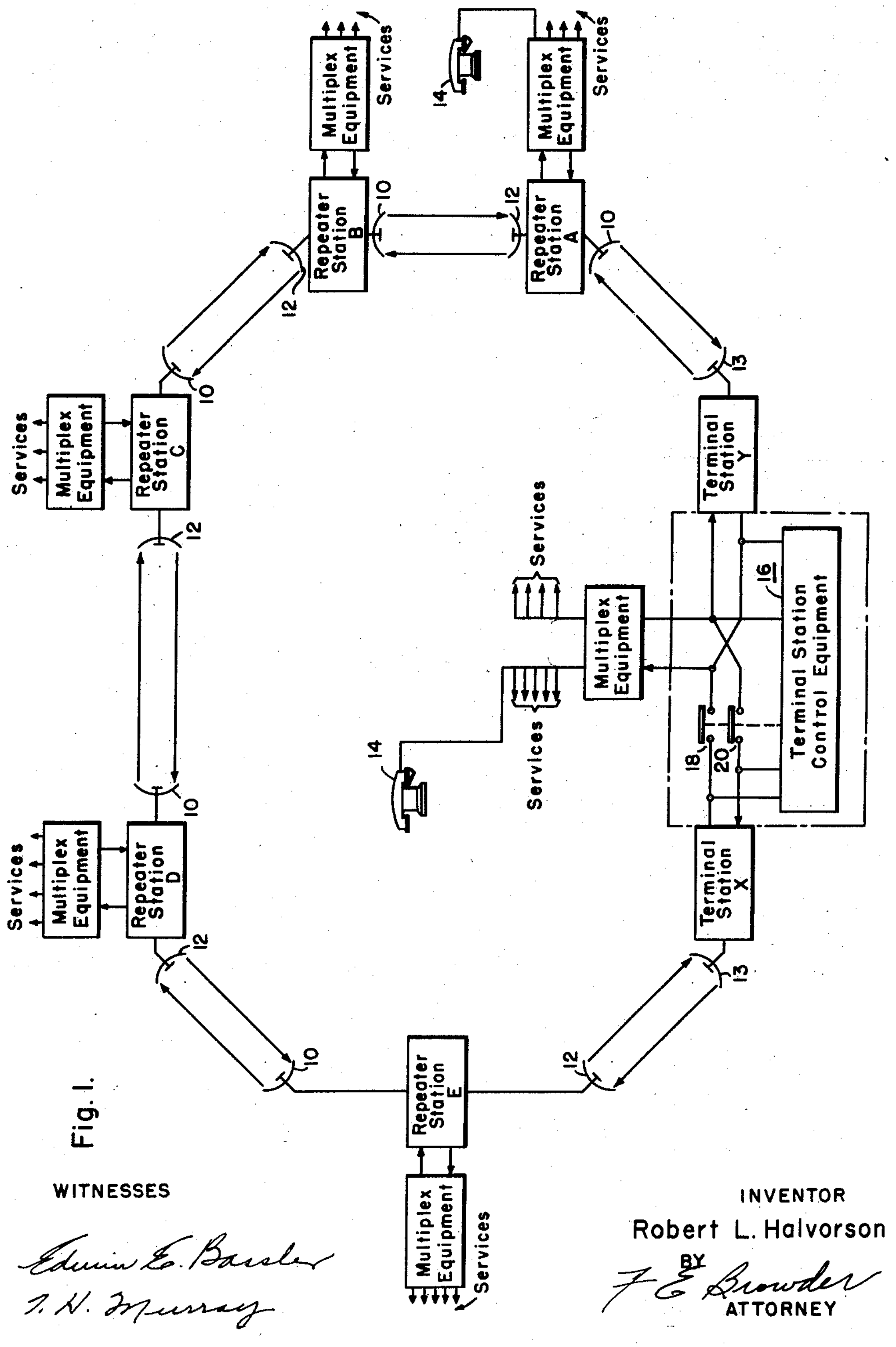
Figure 1 is a drawing showing the general overall concept of my improved microwave system.

Referring to Fig. 1, it can be seen that the closed loop communication system shown includes a plurality of spaced repeater stations A, B, C, D and E. Each of the repeater stations is equipped with two directional antennas 10 and 12. Because of the duplexing equipment in the repeater stations, hereinafter described, each antenna may simultaneously receive and transmit signals of slightly different frequencies. Antenna 12 of station A is aimed or pointed in the direction of antenna 10 of station B and vice versa so that the paths of the line-of-sight carrier signals radiated from these two antennas coincide. In a similar manner, station B is linked with station C, station C is linked with station D, and so on. The carrier signal radiated from antenna 12 in station A, for example, is a microwave signal in the range of 2000 megacycles. This signal is frequency modulated with 30 sub-carrier signals, each of the sub-carriers being a band approximately 10 kilocycles wide in the range between 300 and 600 kilocycles. In actual practice, there will be a 50 megacycle spread in the frequency between the signal radiated from antenna 12 in station A and that radiated from antenna 10 in station B. This condition prevents heterodyne interference between the two signals which would otherwise occur if the carriers were of exactly the same frequency.

Terminal stations X and Y are substantially the same as the repeater stations except that they have only one directional antenna 13 and do not relay signals. As illustrated, the terminal stations are at the same physical location. However, they may be separated if desired. It is only necessary, for reasons hereinafter more fully described, that connections be provided between the transmit channel of one terminal station and the receive channel of other station, and vice versa. These connections may extend over long distances if the terminal stations are separated.

In order to "bundle up" the aforesaid 30 sub-carrier signals for transmission on the single microwave carrier signal, multiplexing equipment is provided. Multiplexing may be done in either one of two ways, by time division or by frequency division. In the present instance, frequency division multiplexing is used which permits all of the sub-carriers to be transmitted on the microwave carrier simultaneously. Since each of the sub-carriers differs in frequency from the other, they may all modulate the microwave carrier together. Every sub-carrier is amplitude modulated in the multiplexing equipment with its particular signal (which may be voice, telegraph or other intelligence). At a receiving station the carrier signal is demodulated and the various sub-carriers are then separated by feeding them through bandpass filters into separate channels. The various modulated sub-carriers are demodulated in their respective channels so that the audio, telegraph or other intelligence signals may be recovered. These signals are then fed to intelligence reproducing means at each repeater station such as telephone hand set 14, for example, where an audio signal is converted into audible sounds. In the drawing, the intelligence reproducing means are generally indicated by "services." These "services" may, for example, include teletype circuits, party-line circuits, private line circuits, facsimile circuits, or program circuits.

The above discussion has been more or less confined to two adjacent terminal stations. It should be understood, however, that an intelligence signal originating at terminal station Y is relayed through repeater stations A, B, C, D and E to terminal station X. Likewise, an intelligence signal from repeater station D is relayed in one direction through station E to terminal station X and in the other direction through repeater stations C, B, and A to terminal station Y. At any one of the stations which is provided with multiplex equipment a sub-carrier signal may be "picked off" the microwave carrier and demodulated to recover its intelligence. In most cases many of the repeater stations will not be equipped with multiplex equipment and will serve only to relay signals from a preceding station to a succeeding station. Only terminal station Y in the drawing of Fig. 1 is provided with multiplex equipment since both terminal stations are at the same physical location. However, both terminal stations may be provided with multiplex equipment if they are separated.

It is apparent from the foregoing description that a continuous communication chain is established between terminal station X and terminal station Y. If one of the transmitters or receivers at any repeater station should fail, this chain will be broken. The main purpose of the present invention, as was explained above, is to keep this chain intact at all times. This is accomplished primarily by the terminal station control equipment 16 together with auxiliary switching apparatus, hereinafter described, at each of the repeater stations. As will become apparent from the following detailed description, when any repeater station in the system fails, contacts 18 and 20 will close to thereby convert terminal stations X and Y into a repeater station. Suppose, for example, that the transmitter associated with antenna 10 at repeater station C should fail. Without the terminal station control equipment station C could not now communicate with stations A and B. However, with the terminal control equipment, intelligence signals will be relayed through the operable transmitter at station C associated with antenna 12, through station D, station E, and terminal stations X and Y to stations A and B, and vice versa. Thus, communication is always maintained between all of the stations regardless of whether or not a transmitter or receiver in the system fails.

Figure 2:
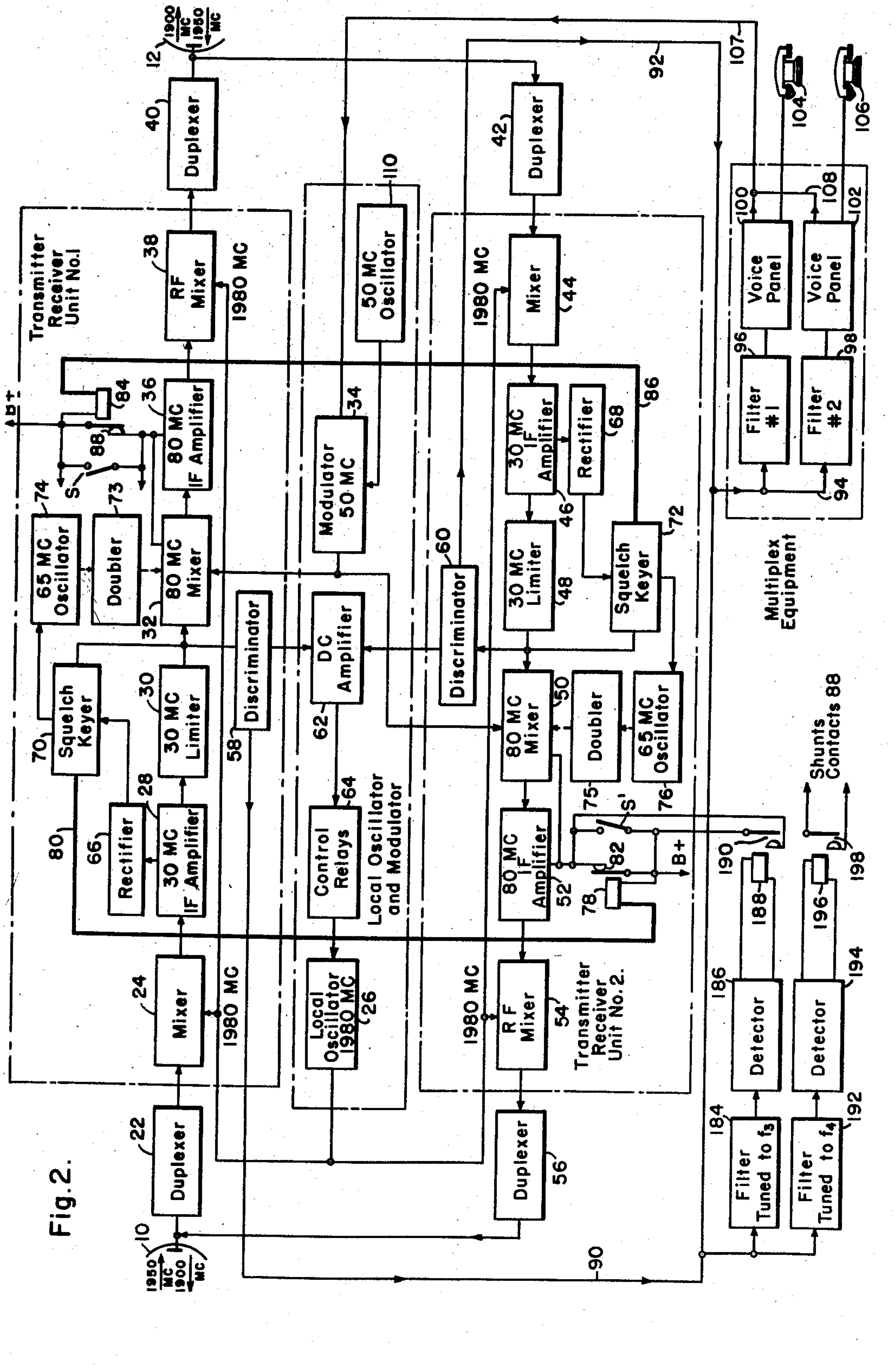
Fig. 2 is a detailed block and schematic diagram of the repeater stations shown in Fig. 1.

Referring to Fig. 2, the frequency of the microwave carrier signal received by antenna 10 at the repeater station shown is 1950 megacycles. This signal is fed through a duplexer 22 to a mixer circuit 24 where it is combined with a 1980 megacycle signal from local oscillator 26. The resulting difference frequency from mixer 24 is fed through 30 megacycle IF amplifier 28 and limiter 30 to mixer 32 where it is combined with the output of 50 megacycle modulator 34. The frequencies in mixer 32 are added, and the resulting sum frequency of 80 megacycles is fed through IF amplifier 36 to a second mixer 38 where the signal is again combined with the 1980 megacycle signal from the local oscillator 26. The resulting difference frequency from mixer 38 is then amplified (amplifier not shown) and fed through duplexer 40 to antenna 12 where it is radiated as a 1900 megacycle signal.

The channel for signals passing through the repeater station going in the opposite direction is substantially identical to the channel just described. A 1950 megacycle signal received by antenna 12 is fed through duplexer 42 to mixer 44 where it is combined with the 1980 megacycle output of the oscillator 26. The resulting difference frequency is fed through 30 megacycle IF amplifier 46 and limiter 48 to mixer 50 where the signal is combined with the output of 50 megacycle modulator 34. From mixer 50 the signal passes through amplifier 52 to a second RF mixer 54 where it is again combined with the 1980 megacycle output of oscillator 26. From mixer 54 it is amplified (amplifier not shown) and passes through duplexer 56 to antenna 10 where it is radiated as a 1900 megacycle signal.

Duplexers 22, 40, 42 and 56 are essentially band-pass filters. Duplexer 22, for example, will pass a received signal of 1950 megacycles while presenting a high insertion loss to the transmitted signal 1900 megacycles. On the other hand duplexer 56 will present a low insertion loss to the transmitted signal while presenting a high loss to the received signal of 1950 megacycles. All the other circuits in the two signal channels are well known by those familiar with the art and may be found in standard textbooks.

In the example shown, the signal is received at 1950 megacycles and transmitted at 1900 megacycles. For transmission in the reverse direction the signal is received at 1950 megacycles and transmitted at 1900 megacycles. However, it will be required at the following repeater station in either direction that signals be received at 1900 megacycles and transmitted at 1950 megacycles. This is accomplished by suitable changes in the frequency of the local oscillator 26 and the transmitter and receiver duplexers. At the next repeater station, for example, the local oscillator 26 will have to operate at 1870 megacycles. In any station, however, the combination of frequencies in the heterodyning process of the crystal mixer 24 or 44, the 80 megacycle mixer 32 or 50 and the RF mixer 38 or 54 is such that the transmitted signal is shifted upward or downward from the received frequency only by the frequency of the 50 megacycle modulator 34 and is not affected by the frequency of the local oscillator 26. This is because the local oscillator enters twice into the heterodyne process and any difference in the oscillator frequency will be cancelled out. It is very necessary to control the frequency of the local oscillator 26 in order that the intermediate frequency derived from crystal mixers 24 and 44 will be maintained in the center of the pass band of the 30 megacycle amplifiers 28 and 46. This is accomplished by the 30 megacycle discriminators 58 and 60 which provide opposing D.C. outputs which are amplified in the D.C. amplifier 62 to operate the control relays 64 which, in turn, control the frequency of the local oscillator 26. The automatic frequency control system of circuits 58, 60, 62 and 64 thus maintains the frequency of local oscillator 26 at a predetermined set frequency.

The transmitter of a repeater station obviously will not radiate a signal unless one is being received by its associated receiver and this receiver is operating properly. Thus, it is necessary that provision be made for effectively replacing the received signal in the event that the received signal or receiver should fail. This will permit operation of the system on either side of a faulty station. In order to insure that the received signal will be replaced if it should fail, part of the carrier signal passing through amplifiers 28 and 46 is rectified in rectifiers 66 and 68. The D.C. outputs of the rectifiers 66 and 68 are applied to squelch keyer circuits 70 and 72 which hold 65 megacycle oscillators 74 and 76 inactive as long as the rectified signal is being received from the rectifiers. Should the 30 megacycle signal fail, the loss of a D.C. output from rectifiers 66 and 68 will cause oscillators 74 and 76 to become active through keyer 70 or 72. After doubling the 65 megacycle frequency in circuit 73 or 75, it is fed into the 80 megacycle mixer. This frequency, in combination with the 50 megacycle output of the modulator, again produces the necessary 80 megacycle output for the 80 megacycle IF amplifiers 36 and 52.

The squelch keyer 70 also serves to control operation of a relay 78. Whenever there is an absence of a received signal at antenna 10, there will no longer be a 30 megacycle signal in IF amplifier 28; and, consequently, the D.C. output of rectifier 66 will disappear. This action causes squelch keyer 70 to ground path 80. Relay 78 then becomes energized and contact 82 opens to break the connection of the anode voltage source to mixer 50 and amplifier 52. Therefore, when there is an absence of a received signal at antenna 10, relay 78 will become energized to disable mixer 50 and amplifier 52 and prevent transmission of signals from that antenna. In a similar manner, squelch keyer 72 controls the operation of a relay 84. When there is an absence of a received signal at antenna 12, squelch keyer 72 will ground path 86 in the absence of a D.C. output from rectifier 68 and will cause energization of relay 84, thereby opening contacts 88 and removing the anode voltage supply from mixer 32 and amplifier 36. It can thus be seen that whenever there is an absence of a received carrier signal at a particular antenna, transmission of signals from that antenna will be prevented.

Figure 3:
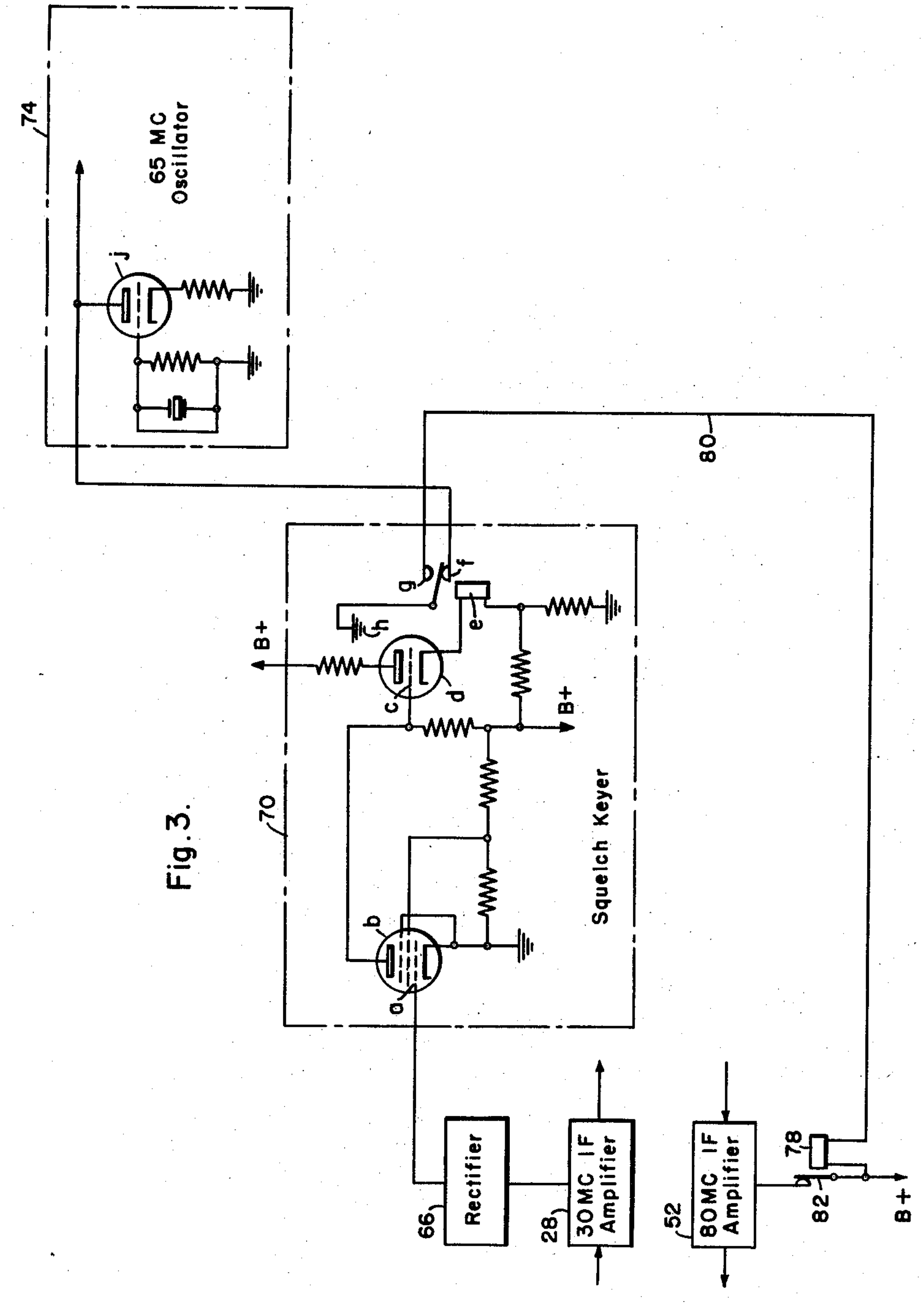
Fig. 3 is a circuit diagram of the squelch keyers of the invention and their associated components.

The details of the squelch keyers are shown in Fig. 3 where squelch keyer 70 and its associated circuits are used for purposes of illustration. The output of rectifier 66 is applied to the control grid *a* of a pentode vacuum tube *b*. Under normal conditions, when a 30 megacycle signal is present in amplifier 28, rectifier 66 will apply a negative bias to control grid *a*. Tube *b* will, therefore, be cut off and a positive bias will be applied to the grid *c* of control tube *d*, thereby causing conduction in tube *d*. In the cathode circuit of tube *d* is the energizing coil *e* of a relay having a pair of normally closed contacts *f* and a pair of normally open contacts *g*. The movable contact member of the relay is grounded at point *h*. Under normal conditions when tube *d* is conducting, energizing coil *e* will be energized; and contacts *f* will ground the plate of oscillator tube *j* in 65 megacycle oscillator 74. When the 30 megacycle signal in amplifier 28 fails, the output of rectifier 66 will drop to zero; and, therefore, the bias on grid *c* will be driven negative to a point where tube D ceases to conduct, thereby causing deenergization of coil *e*. This action closes contacts *g* and opens contacts *f* to thereby transfer the ground connection to path 80. Oscillator 74 will now produce an output signal since its plate circuit is ungrounded and relay 78 will become energized to break the connection of the anode voltage source to amplifier 52 and mixer 50 (not shown in Fig. 3).

Referring again to Fig. 2, discriminators 58 and 60 are connected through paths 90 and 92 to a receive bus 94 in the multiplex equipment shown at the bottom portion of the drawing. Connected to receive bus 94 are filters 96 and 98. Although only two filters are shown in the present instance, an actual installation may include 30 filters. Filter 96 may be tuned to 305 kilocycles, whereas filter 98 may be tuned to 315 kilocycles. Additional filters, not shown, will be tuned at 10 kilocycle spacings over the range between 300 and 600 kilocycles. In discriminators 58 and 60 the carrier signals received from antennas 10 and 12, respectively, are demodulated so that the signals passing through paths 90 and 92 are sub-carrier signals which are amplitude modulated with intelligence signals. Each of these signals passes through the filter in the multiplex equipment which is tuned to its particular frequency. From the filters the signals pass to voice panels 100 and 102 where the sub-carriers are demodulated and the resulting intelligence signals are passed on to intelligence reproducing devices such as telephone hand sets 104 and 106. Each of the voice panels includes an oscillator for generating a sub-carrier signal of a particular frequency in the range between 300 and 600 kilocycles and also a modulator for modulating its sub-carrier signal with intelligence signals from the microphone in its associated telephone hand set. The various modulated sub-carrier signals from the voice panels are then fed to a transmit bus 108 and are applied via path 107 to modulator 34 which modulates a 50 megacycle signal from oscillator 110 with these sub-carrier signals. From modulator 34 the modulated 50 megacycle signal is fed into the two main signal channels of the repeater station to be transmitted in both directions to other stations in the system where they may be detected by the receiving apparatus at those stations.

Figure 4:
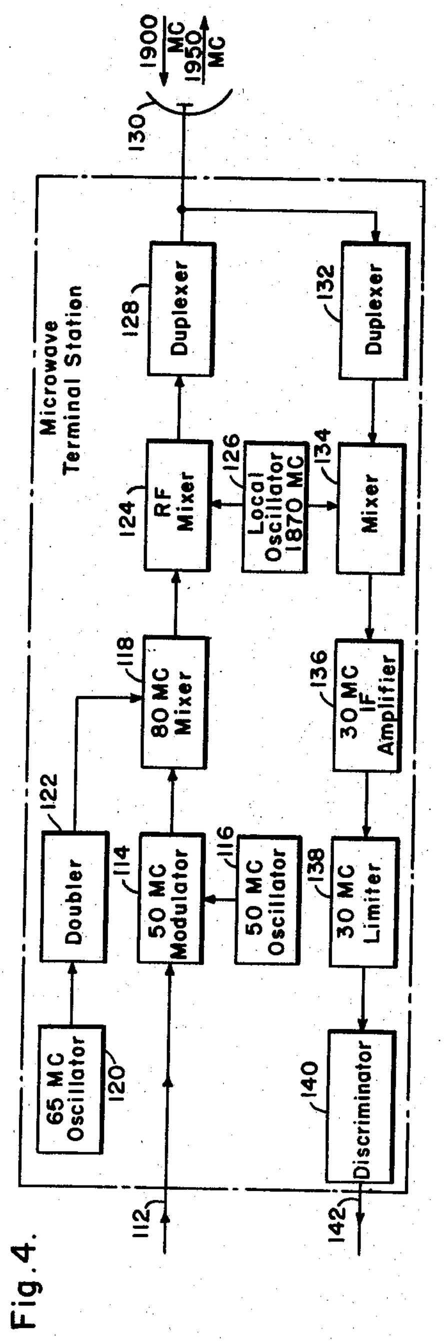
Fig. 4 is a detailed block and schematic diagram of the terminal stations shown in Fig. 1.

Referring to Fig. 4, the detailed terminal station shown is substantially the same as the repeater station just described. Signals on transmit bus 112 from the multiplex equipment, not shown, are fed to 50 megacycle modulator 114 which modulates the output of 50 megacycle oscillator 116 with these signals. From modulator 114 the signals are passed to mixer 118 where they are combined with a 130 megacycle signal produced by oscillator 120 and doubler 122. The resulting difference frequency from 80 megacycle mixer 118 is fed to RF mixer 124 where it is combined with the 1870 megacycle output of local oscillator 126. The output signal from mixer 124 has a frequency of 1950 megacycles and is passed through duplexer 128 to antenna 130.

Received signals of 1900 megacycles at antenna 130 are passed through duplexer 132 to mixer 134 where they are combined with the 1870 megacycle output of local oscillator 126. The difference frequency of 30 megacycles is passed through amplifier 136 and limiter 138 to a discriminator 140 where the frequency modulated microwave carrier signal is detected and the sub-carrier signals are passed on to receive bus 142 and, hence, to the multiplex equipment. Local oscillator 126 is provided with a frequency control circuit, not shown, like the frequency control circuit described in connection with the repeater station of Fig. 2.

Figure 5:
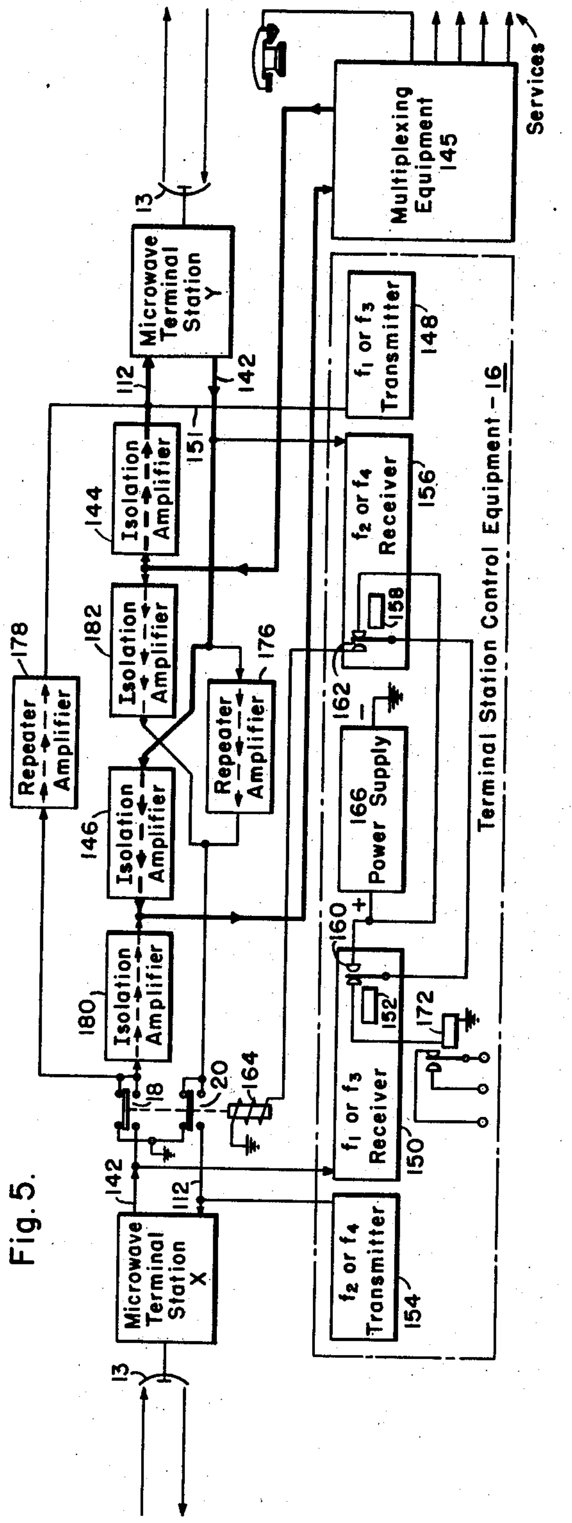
Fig. 5 is a detailed block and schematic diagram of the terminal station control equipment shown in Fig. 1.

Fig. 5 shows two terminal stations X and Y in block form together with the terminal station control equipment 16. It can be seen that the transmit bus 112 of terminal station Y is connected through isolation amplifier 144 to the multiplexing equipment 145 for that station. Receive bus 142 is connected through isolation amplifier 146 to the multiplexing equipment. The amplifiers 144 and 146 are called "isolation" amplifiers since they will pass a signal in one direction while blocking signals in the other direction. The direction of signal transmission through the various amplifiers is indicated by the dotted arrows shown. The terminal station control equipment 16 is provided with a first transmitter 148 which generates a sub-carrier pilot signal $f_1$. This sub-carrier signal is impressed on transmit bus 112 via path 151 and, hence, is transmitted from the microwave terminal station Y on a 1950 megacycle signal. The sub-carrier pilot signal will be relayed through stations A, B, C, D and E as shown in Fig. 1 to terminal station X where it will be impressed on receive bus 142 after detection, thus providing continuous supervision of the microwave system in the counterclockwise direction. The pilot signal $f_1$ will be one of the 30 different frequency sub-carriers in the range between 300 and 600 kilocycles. If it is assumed that $f_1$ has a frequency of 325 kilocycles, this signal will pass through a filter in receiver 150 tuned to 325 kilocycles and will be detected to produce a D.C. control voltage which will cause energization of relay 152. The terminal station control equipment also includes a transmitter 154 which generates a second pilot sub-carrier $f_2$ in the range between 300 and 600 kilocycles. This sub-carrier is impressed on the transmit bus 112 of terminal station X and is relayed through the repeater stations E, D, C, B and A to terminal station Y, thus providing continuous supervision of the microwave system in the clockwise direction. Receiver 156 in the terminal station control equipment will detect the signal of frequency $f_2$ to produce a D.C. control voltage which will cause energization of a relay 158.

Actually, the two pilot signals described above may be of the same frequency since the microwave system is a "four wire" system. That is, since the pilot signals are propagated in opposite directions around the communication chain, they are transmitted on different microwave carrier signals; and, therefore, they will not interfere with each other.

If one of the repeater stations in the microwave communication chain should fail or communication should otherwise be broken between two of the repeater stations, the signals $f_1$ and $f_2$ will not be received by their associated receivers 150 and 156, respectively. Therefore, relays 152 and 158 will now become deenergized to close contacts 160 and 162. This action causes energization of relay 164 which now has its ungrounded terminal connected to the positive terminal of power supply 166 through contacts 160 and 162. Energization of relay 164, in turn, causes contacts 18 and 20 to close. It should be noted that when relays 152 and 158 are energized, an energizing circuit is completed for relay 172. This relay controls indicating circuitry, not shown, which indicates that a break has occurred somewhere in the system. When contacts 18 and 20 close, the receive bus 142 of terminal station Y will be connected through repeater amplifier 176 to the transmit bus 112 of terminal station X. Likewise, the receive bus 142 of terminal station X will be connected through repeater amplifier 178 to the transmit bus 112 of terminal station Y. The corresponding transmit and receive buses of stations X and Y cannot be connected together because of isolation amplifiers 180 and 182 which effectively isolate the corresponding buses from each other. Received sub-carrier signals at terminal station X can now be fed to multiplex equipment 145 via amplifier 180, and received sub-carriers at station Y can be fed to equipment 145 via amplifier 146. In a similar manner, the outgoing signals from the multiplex equipment are fed to the terminal stations through amplifiers 144 and 182 for transmission in both directions.

It should be noted that when contacts 18 and 20 are closed, the two terminal stations X and Y, in effect, become a repeater station. That is, a received signal at station Y after being detected in discriminator 140 will pass through receive bus 142 and amplifier 176 to transmit bus 112 in terminal station X where it will be relayed to the next suceeding repeater station in the microwave system. Likewise, signals received by terminal station X, after being detected in the discriminator 140 of that station, will pass through receive bus 142 and amplifier 178 to the transmit bus 112 of the terminal station Y where they will be relayed to the next succeeding repeater station.

If there is an equipment failure at one of the repeater stations in the network, it will probably occur in only one of the two signal channels at that station. Suppose, for example, that at station B shown in Fig. 1 the IF amplifier 28 shown in Fig. 2 should fail. Amplifier 28 normally serves to amplify received carrier signals from antenna 10 at station B. The rectified output of rectifier 66 will now drop to zero and squelch keyer 70 will ground one side of relay 78 to thereby disable mixer 50 and IF amplifier 52. Thus, radiation from antenna 10 at station B is effectively stopped. As a result there will be an absence of a received carrier signal at antenna 12 in repeater station A. This causes the rectified output of rectifier 68 (Fig. 2) in repeater station A to drop to zero. Squelch keyer 72 will now ground one side of relay 84 in station A to thereby disable mixer 32 and IF amplifier 36. In this manner all transmission is stopped in the path between stations A and B. Repeater station B is now operating as a terminal station through antenna 12 and repeater station A is now operating as a terminal station through antenna 10. It should be noted that contacts 18 and 20 at the terminal station shown in Fig. 5 will not close until both the transmitting and receiving channels of the repeater stations are disabled. That is, when IF amplifier 28 initially fails, the signal $f_2$ from transmitter 154 will not be received by receiver 156, thus causing contacts 162 to close. However, before contacts 18 and 20 will close, mixer 50 and IF amplifier 52 must become disabled so that the signal $f_1$ from transmitter 148 is not received by receiver 150 to thereby deenergize relay 152 and close contacts 160. If transmission in both directions at the faulty repeater were not stopped before the closure of contacts 18 and 20, a complete closed ring would be established, thereby providing an unstable "singing" condition which could possibly cause an interruption of communication among the various stations. By interlocking relays 158 and 152 as described above such that both must operate due to no received pilot signals before relay 164 operates to close contacts 18 and 20, this condition is prevented. That is, it is always assured that the transmitting and receiving apparatus at a repeater station will be disabled before the microwave terminal stations are connected as a repeater station.

After communication is once broken between two successive repeater stations in the system, the squelch keyers at the two stations will hold the transmitters of these stations cutoff indefinitely. Therefore, some means must be provided for initiating transmission in at least one of the two stations. Assuming that the equipment in each station is restored to workable condition after a break, it is necessary that only one of the transmitters be rendered operative initially. The signal from this one station will then cause the energizing relay *e* (Fig. 3) of the squelch keyer at the other station to become energized. This action, in turn, causes the relay 78 or 84 (Fig. 2) to become deenergized also to thereby render the transmitting equipment at the second station operative automatically. In the present embodiment simple manually operated switches S and S′ (Fig. 2) are provided which shunt contacts 88 and 82, respectively. By closing these switches, a source of anode voltage is connected to the transmitting equipment to render it operative after relay 84 or 78 becomes energized. Other types of well-known switching devices could be used to replace the manually operated ones shown in the present embodiment. For example, an automatic time switch could be used which would close periodically. This type of switch would be particularly suitable in cases where a break in communication occurs because the carrier signal between the two stations is curved due to atmospheric conditions rather than because of an equipment failure. The time switch could be made to recycle until the abnormal atmospheric condition ceases and normal communication is established.

A certain refinement in the basic control equipment described above is necessary where the system is installed in a geographical area subject to fades which affect several paths simultaneously. It can be seen from Fig. 2 in the above description that if the received signals arriving at antennas 10 and 12 should both disappear simultaneously, the repeater station will lock itself out from the remaining stations in the system. That is, when there is an absence of a received signal at antenna 10, squelch keyer 70 will lock out IF amplifier 52, and when there is an absence of a received signal at antenna 12, squelch keyer 72 will disable IF amplifier 36, thereby preventing transmission of signals in both directions. Locking out a repeater station completely in this manner due to fades on each side is an intolerable situation since under this condition the communication chain can not be kept intact.

Obviously there can be no complete continuity of communication between the various stations in the system during the actual multi-hop fade. It is of primary concern, however, to reestablish communication as soon as the fade condition reduces to a point where it affects only one hop.

A preferred embodiment of the refinement of the present invention to prevent complete repeater lockout under multi-fade conditions is shown in Fig. 2. Each repeater station is equipped with a first sub-carrier receiver consisting of a filter 184 tuned to frequency $f_3$, a detector 186, and a relay 188. The contacts 190 of relay 188 are normally open when a sub-carrier signal of a frequency $f_3$ is present on path 90 and receive bus 94. The repeater station is also equipped with a second receiver consisting of a filter 192 tuned to frequency $f_4$, a detector 194 and a relay 196. The contacts 198 of relay 196 are normally open when a received sub-carrier signal of frequency $f_4$ is present on received bus 94. Contacts 190 are wired to shunt contacts 82 and contacts 198 are wired to shunt contacts 88. The first receiver just described is designed to receive a sub-carrier signal of frequency $f_3$ transmitted by transmitter 148 at terminal station Y. The second receiver likewise receives a sub-carrier signal of frequency $f_4$ generated by transmitter 154 at terminal station X. Suppose, for example, that atmospheric conditions are such that a break in the path occurs on each side of repeater station C. Station C is not now in communication with the remaining stations because its antenna 12 is not receiving signals from antenna 10 of station D and vice versa. Without the present refinement, station C would then be locked out. More specifically, both transmitters at station C would be disabled since there is an absence of the received signal from both directions. However, when station C is equipped with the two control receivers shown in Fig. 2 the transmitters associated with antennas 10 and 12 of station C are prevented from being disabled. That is to say, since the signal of frequency $f_3$ is not received during the fade contacts 190 close to shunt contacts 82 associated with IF amplifier 52 and thus amplifier 52 continues to operate even though contacts 82 open. Also, since a signal of frequency $f_4$ is not received contacts 198 close to shunt contacts 88 and allow IF amplifier 36 to continue in an operating condition even though contacts 88 are open.

Thus, both transmitters operate during a fade affecting both sides of a repeater station. As soon as a fade reduces to one hop between stations complete communication is established around the system utilizing the terminal stations X and Y as a repeater station. One transmitter, however, is still locked out even after all fades disappear. Transmission can be restored in the locked-out transmitter by manually interrupting the sub-carrier at either transmitter 148 or 154 (Fig. 5) which energizes the locked-out transmitter. For example, if IF amplifier 52 is locked-out, interrupting the signal received by detector 186 will close contacts 190, thereby energizing IF amplifier 52. This, in turn, energizes the transmitter at the other locked-out station and contacts 18 and 20 at the terminal stations open to restore the system to normal operation.

It can thus be seen that the present invention provides a closed loop microwave communication system in which the two terminal stations at the opposite ends of the system are converted into a repeater station whenever there occurs a failure of a repeater station in the network. Although I have described my invention in connection with a certain specific embodiment, it should be apparent to those skilled in the art that various changes in form and arrangement of parts can be made to suit requirements without departing from the spirit and scope of the invention.

I claim as my invention:

1. A point to point radio communication network comprising, a plurality of spaced repeater stations each of which is adapted to receive and transmit in two directions a line-of-sight carrier signal modulated with a plurality of different frequency sub-carrier signals, first and second terminal stations at the opposite ends of said network adapted to transmit and receive in one direction a line-of-sight carrier signal modulated with a plurality of sub-carrier signals, each of said terminal stations including a signal channel for received signals and a signal channel for transmitted signals, means at the first of said terminal stations for generating a first sub-carrier signal which is transmitted through said repeater stations to the second terminal station, said first sub-carrier being of a predetermined frequency $f_1$, means at the second of said terminal stations for generating a second sub-carrier signal which is transmitted through said repeater stations to the first terminal station, said second sub-carrier being of a predetermined frequency $f_2$, receivers at said first and second terminal stations for detecting said second and first sub-carrier signals respectively, normally open switching means adapted when closed to connect the receive channel of said first terminal station to the transmit channel of said second terminal station and vice versa to thereby convert said terminal stations into a repeater station, means responsive to the detected outputs of the receivers at said first and second terminal stations for closing said switching means in the absence of a detected output from both of said receivers, and means at each of said repeater stations for blocking transmission of a line-of-sight carrier signal in a particular direction whenever there is an absence of a line-of-sight signal from that direction.

2. A point to point radio communication network comprising a plurality of spaced repeater stations each of which is adapted to receive and transmit in two directions a line-of-sight carrier signal modulated with a plurality of different frequency sub-carrier signals, first and second terminal stations at the opposite ends of said network adapted to transmit and receive in one direction a line-of-sight carrier signal modulated with a plurality of sub-carrier signals, each of said terminal stations including a signal channel for received signals and a signal channel for transmitted signals, means at the first of said terminal stations for generating a first sub-carrier signal which is transmitted through said repeater stations to the second terminal station, means at the second of said terminal stations for generating a second sub-carrier signal which is transmitted through said repeater stations to the first terminal station, receivers at said first and second terminal stations for detecting said second and first sub-carrier signals respectively, normally open switching means adapted when closed to connect the receive channel of said first terminal station to the transmit channel of said second terminal station and vice versa to thereby convert said terminal stations into a repeater station, and means responsive to the detected outputs of the receivers at said first and second terminal stations for closing said switching means in the absence of a detected output from both of said receivers.

3. A point to point radio communication network comprising a plurality of spaced repeater stations each of which is adapted to receive and transmit in two directions a carrier signal modulated with a plurality of sub-carrier signals, first and second terminal stations at the opposite ends of said network adapted to transmit and receive in one direction a carrier signal modulated with a plurality of sub-carrier signals, each of said terminal stations including a channel for received signals and a channel for transmitted signals, means at the first of said terminal stations for generating a first sub-carrier signal which is transmitted through said repeater stations to the second terminal station, means at the second terminal station for generating a second sub-carrier signal which is transmitted through said repeater stations to the first terminal station, receivers at said first and second terminal stations for detecting said second and first sub-carrier signals respectively, normally open switching means adapted when closed to connect the receive channel of said first terminal station to the transmit channel of said second terminal station and vice versa to thereby convert said terminal stations into a repeater station, means for closing said switching means in response to the absence of a detected output from both of said receivers, and means at each of said repeater stations for blocking transmission of a carrier signal in one direction whenever there is an absence of a received carrier signal from that direction.

4. A point to point radio communication network comprising a plurality of spaced repeater stations each of which is adapted to receive and transmit in two directions a carrier signal modulated with a plurality of sub-carrier signals, first and second terminal stations at the opposite ends of said network adapted to transmit and receive in one direction a carrier signal modulated with a plurality of sub-carrier signals, each of said terminal stations including a channel for received signals and a channel for transmitted signals, means at the first of said terminal stations for generating a first sub-carrier signal which is transmitted through said repeater stations to the second terminal station, means at the second terminal station for generating a second sub-carrier signal which is transmitted through said repeater stations to the first terminal station, receivers at said first and second terminal stations for detecting said second and first sub-carrier signals respectively, normally open switching means adapted when closed to connect the receive channel of said first terminal station to the transmit channel of said second terminal station and vice versa to thereby convert said terminal stations into a repeater station, and means for closing said switching means in response to the absence of a detected output from both of said receivers.

5. A point to point radio communcation network comprising a plurality of spaced repeater stations each of which is adapted to relay a plurality of intelligence signals in one direction from a preceding station to a succeeding station, each of said stations also being adapted to relay a plurality of intelligence signals in the opposite direction from a preceding station to a succeeding station, a first signal channel in each of said stations for receiving from one direction a carrier signal modulated with a plurality of intelligence signals and for transmitting a carrier signal modulated with said intelligence signals in another direction, a second signal channel in each of said stations for receiving from said other direction a carrier signal modulated with a plurality of intelligence signals and for transmitting a carrier signal modulated with said intelligence signals in said one direction, means for rendering the transmitting apparatus in said first channel inoperative in the absence of a received carrier signal in said second channel, means for rendering the transmitting apparatus of said second channel inoperative in the absence of a received carrier signal in said first channel, first and second terminal stations at the opposite ends of said network, each of said terminal stations including a channel for received signals and a channel for transmitted signals, means at said first terminal station for generating a first signal which is transmitted through said repeater stations to said second terminal station, means at said second terminal station for generating a second signal which is transmitted through said repeater stations to said first terminal station, receivers at said first and second terminal stations for said second and first signals respectively, switching apparatus adapted when closed to connect the receive channel of said first terminal station to the transmit channel of said second terminal station and vice versa to thereby convert said terminal stations into a repeater station, and means responsive to the outputs of the receivers at said first and second terminal stations for closing said switching apparatus in the absence of a detected output from both of said receivers.

6. A point to point radio communication network comprising a plurality of spaced repeater stations each of which is adapted to relay a plurality of intelligence signals in one direction from a preceding station to a succeeding station, each of said stations also being adapted to relay a plurality of intelligence signals in the opposite direction from a preceding station to a succeeding station, a first signal channel in each of said stations for receiving from one direction a carrier signal modulated with a plurality of intelligence signals and for transmitting a carrier signal modulated with said intelligence signals in another direction, a second signal channel in each of said stations for receiving from said other direction a carrier signal modulated with a plurality of intelligence signals and for transmitting a carrier signal modulated with said intelligence signals in said one direction, means for rendering the transmitting apparatus in said first channel inoperative in the absence of a received carrier signal in said second channel, means for rendering the transmitting apparatus of said second channel inoperative in the absence of a received carrier signal in said first channel, first and second terminal stations at the opposite ends of said network, each of said terminal stations including a channel for received signals and a channel for transmitted signals, means at said first terminal station for generating a first signal which is transmitted through said repeater stations to be received by said second terminal station, means at said second terminal station for generating a second signal which is transmitted through said repeater stations to be received by said first terminal station, switching apparatus adapted when closed to connect the receive channel of said first terminal station to the transmit channel of said second terminal station and vice versa to thereby convert said terminal stations into a repeater station, and means for closing said switching apparatus whenever both of said first and second signals are not received by said second and first terminal stations respectively.

7. A point to point radio communication network comprising a plurality of spaced repeater stations each of which is adapted to relay a plurality of intelligence signals in one direction from a preceding station to a succeeding station, each of said stations also being adapted to relay a plurality of intelligence signals in the opposite direction from a preceding station to a succeeding station, first and second terminal stations at the opposite ends of said network, means at said first terminal station for generating a first signal which is transmitted through said repeater stations to said second terminal station, means at said second terminal station for generating a second signal which is transmitted through said repeater stations to said first terminal station, receiving means at said first and second terminal stations for said second and first signals respectively, apparatus for connecting said terminal stations together to form a repeater station, and means responsive to the detected outputs of said receivers for actuating said apparatus to connect said terminal stations together in the absence of a detected output from both of said receivers.

8. A point to point radio communication system including at least one repeater station, a first signal channel in said station adapted to receive a line-of-sight carrier signal from one direction and transmit a line-of-sight carrier signal in another direction, a second signal channel in said station adapted to receive a line-of-sight carrier signal from said other direction and transmit a line-of-sight carrier signal in said one direction, transmitting apparatus in each of said channels, a first normally closed relay in said first channel adapted when open to disable the transmitting apparatus in said first channel, a second normally closed relay in said second channel adapted when open to disable the transmitting apparatus in said second channel, means in each of said channels for rectifying at least a portion of a received carrier signal, a device in said first channel and responsive to the output of the rectifying means of said first channel for controlling said second relay, and a device in said second channel and responsive to the output of the rectifying means of said second channel for controlling said first relay.

9. A point to point radio communication system comprising first and second normally disconnected terminal stations each of which is adapted to transmit and receive a plurality of intelligence signals, a plurality of spaced repeater stations adapted to relay intelligence signals from one terminal station to the other, means at said first terminal station for generating a first intelligence signal which is transmitted through said repeater stations to said second terminal station, means at said second terminal station for generating a second intelligence signal which is transmitted through said repeater stations to said first terminal station, receivers at said first and second terminal stations for detecting said second and first intelligence signals respectively, apparatus for connecting said terminal stations together to form a repeater station which will relay intelligence signals, and means responsive to the detected outputs of said receivers for actuating said apparatus to connect said terminal stations together in the absence of a detected output from both of said receivers.

10. The combination claimed in claim 9 in which the said apparatus includes a normally deenergized first relay, and in which the means for actuating said apparatus comprises a source of electrical energy for said first relay, a second relay having normally open contacts, a third relay having normally open contacts, a connection between said first relay and said energy source through the normally open contacts of said first and second relays, means for actuating said second relay to close its contacts whenever said first intelligence signal is not received by the receiver at said second terminal station, and means for actuating said third relay to close its contacts whenever said second intelligence is not received by the receiver at said first terminal station.

11. A point to point radio communication network comprising a plurality of spaced repeater stations, a first signal channel in each of said stations for receiving from one direction a carrier signal modulated with a plurality of sub-carrier signals and for transmitting a carrier signal modulated with said sub-carrier signals in another direction, a second signal channel in each of said stations for receiving from said other direction a carrier signal modulated with a plurality of sub-carrier signals and for transmitting a carrier signal modulated with said sub-carrier signals in said one direction, first means for rendering the transmitting apparatus of said first channel inoperative in the absence of a received carrier signal in said second channel, second means for rendering the transmitting apparatus of said second channel inoperative in the absence of a received carrier signal in said first channel, first and second terminal stations at the opposite ends of said network, means at said first terminal station for generating a first sub-carrier signal which is transmitted through said repeater stations to be received by said second terminal station, means at said second terminal station for generating a second sub-carrier signal having a frequency which is different from the frequency of said first sub-carrier signal, said second sub-carrier signal being transmitted through said repeater stations to be received by said first terminal station, means for connecting said terminal stations together to form a repeater station whenever both said first and second sub-carrier signals are not received by said second and first terminal stations respectively, a device for rendering the transmitting apparatus of said first channel in each repeater station operative when there is an absence of a received carrier signal in the second channel at that station and when there is an absence of reception of said second sub-carrier signal at that station, and means for rendering the transmitting apparatus of said second channel at each repeater station operative when there is an absence of a received carrier signal in said first channel at that station and when there is an absence of reception of said first sub-carrier signal at that station.

References Cited in the file of this patent

UNITED STATES PATENTS

| | | |
|---|---|---|
| 1,876,694 | Kruesi | Sept. 13, 1932 |
| 2,129,332 | Mastini | Sept. 6, 1938 |
| 2,514,367 | Bond et al. | July 11, 1950 |
| 2,530,748 | Winchel | Nov. 21, 1950 |
| 2,691,065 | Thompson | Oct. 5, 1954 |
| 2,699,496 | Magnuski et al. | Jan. 11, 1955 |
| 2,706,286 | Wheeler et al. | Apr. 12, 1955 |
| 2,726,325 | Beers | Dec. 6, 1955 |

FOREIGN PATENTS

| | | |
|---|---|---|
| 352,098 | Great Britain | July 9, 1931 |